(12) United States Patent
Heinrich et al.

(10) Patent No.: US 8,721,934 B2
(45) Date of Patent: May 13, 2014

(54) METHOD OF REMOVING EXCESS LENS FORMING MATERIAL FROM A MOLDED OPHTHALMIC LENS SUCH AS A CONTACT LENS

(75) Inventors: Axel Heinrich, Aschaffenburg (DE); Roger Biel, Aschaffenburg (DE); Günter Lässig, Obernburg (DE); Jan Bernard, Niedernberg (DE); Stephan Pirl, Obernburg (DE)

(73) Assignee: Novartis AG, Basel (CH)

( * ) Notice: Subject to any disclaimer, the term of this patent is extended or adjusted under 35 U.S.C. 154(b) by 128 days.

(21) Appl. No.: 12/969,700

(22) Filed: Dec. 16, 2010

(65) Prior Publication Data

US 2011/0147960 A1 Jun. 23, 2011

Related U.S. Application Data

(60) Provisional application No. 61/287,260, filed on Dec. 17, 2009.

(51) Int. Cl.
*B29C 37/02* (2006.01)

(52) U.S. Cl.
USPC ............................................. 264/2.7

(58) Field of Classification Search
USPC ............................................. 264/2.7
See application file for complete search history.

(56) References Cited

U.S. PATENT DOCUMENTS

| 6,368,096 B1 | 4/2002 | Dobner |
| 2005/0148285 A1 | 7/2005 | Hosoda |

FOREIGN PATENT DOCUMENTS

| EP | 1927409 | * 11/2006 |
| EP | 1927409 A1 | 6/2008 |
| JP | 1121818 | * 5/1989 |
| JP | 1121818 A | 5/1989 |
| JP | 8206949 A | 8/1996 |
| WO | 9842497 A2 | 10/1998 |

OTHER PUBLICATIONS

PCT International Search Report dated Apr. 4, 2011, International Application No. PCT/EP2010/069941, International Filing Date Dec. 16, 2010.
PCT Written Opinion of the International Searching Authority dated Apr. 4, 2011, International Application No. PCT/EP2010/069941, International Filing Date Dec. 16, 2010.

* cited by examiner

*Primary Examiner* — Yogendra Gupta
*Assistant Examiner* — Robert J Grun
(74) *Attorney, Agent, or Firm* — Robert Ambrose

(57) ABSTRACT

There is described a method of removing excess lens forming material from a molded ophthalmic lens (1), such as the peripheral region of a contact lens. In order to form a lens (1) a lens forming material is polymerized and/or cross-linked within a mold cavity of a mold comprising female and male mold halves. The mold is opened by moving the female and male mold halves apart from each other. The formed lens (1) is supported on a carrier (3) such, that a front surface (2) of the lens (1) is exposed. Residues of non-polymerized and/or non-cross-linked lens forming material are removed mechanically by contacting the exposed surface (2) of the formed lens (1) for a period of time of about 0.5 seconds to about 4 seconds, preferably about 0.8 seconds to about 2 seconds, with a cleaner (7) having a hardness which is smaller than that of the polymerized and/or cross-linked lens forming material. There is also described a device (5) for carrying out the method.

15 Claims, 1 Drawing Sheet

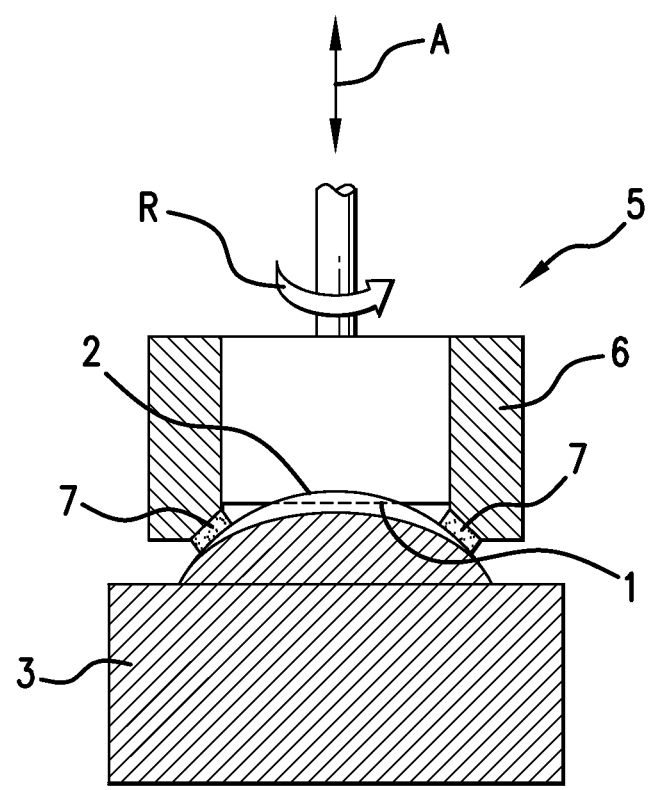

METHOD OF REMOVING EXCESS LENS FORMING MATERIAL FROM A MOLDED OPHTHALMIC LENS SUCH AS A CONTACT LENS

This application claims the benefit under 35 U.S.C. §119(e) of U.S. provisional application Ser. No. 61/287,260, filed on Dec. 17, 2009, incorporated herein by reference in its entirety.

FIELD

The invention relates to a method of removing excess lens forming material from a molded ophthalmic lens, for example the peripheral region of a contact lens. The invention also relates to a device for carrying out the method.

BACKGROUND

It is well established in the art to produce ophthalmic lenses, more specifically hard and soft contact lenses, in an automated manufacture process with reusable molds. In mass production of contact lenses, specifically so-called disposable lenses, a large number of contact lenses must be manufactured in a relatively short period of time. In an advantageous method of mass production, a lens forming material, e.g., a polymer or prepolymer solution is introduced into a female mold half, the casting mold is closed by the respective male mold half and then the lens forming material is polymerized and/or cross-linked e.g. with ultraviolet (UV) light. Such mass production of contact lenses, which is usually performed in a closed loop process, is described, e.g., in WO 98/42497. Suitable polymers formed by photochemical polymerization of suitable prepolymers include polymers based on polyvinyl alcohols (PVA) or silicone hydrogels (SiHy) as well as based on polyethylene glycols (PEG).

During the UV light induced polymerization and/or cross-linking of the lens forming material within the molds the UV light in the respective zones which are outside of the areas required for contact lens production is masked. Thus, due to this spatial limitation of the irradiated UV light only the unmasked portion of the lens forming material in the mold cavity is hardened, whereas excess material e.g. in an overflow of the mold remains attached to the lens as "flash". In order to obtain fault-free lenses these residues of non-polymerized and/or non-cross-linked lens forming material, the "flash" must be separated from the molded lens. This separation is supported by a proper sealing of the mold halves and by a very careful shaping of the mold separation planes, in particular in the edge region of the mold cavity which defines the lens edge. The automated manufacture process is also called "full mold process" because there is no working of the lens edge required after the molding of the lens.

In order to remove a lens from the mold the mold is opened by moving the mold halves away from each other. During the opening of the mold non-polymerized and/or non-cross-linked lens forming material may reach the exposed surface, usually the front surface, of the lens and adhere thereto. Thus, in particular the peripheral region of the formed lens may be soiled. In a known manufacture process there is a cleaning step for the lens provided after the opening of the mold, in which the lens is flushed with a flushing medium, usually deionised water (VE water). In spite of this flushing step there may still occur a certain number of lenses, which still contain residues of non-polymerized and/or non-cross-linked lens forming material in the peripheral region of the exposed (front) surface. These residues are only detected at the optical inspection of the lenses prior to packaging and may result in a considerable number of rejected lenses. Certain lens forming materials are flushed even with an organic solvent, in order to remove the residues of non-polymerized and/or non-cross-linked material from the lens surface. It is to be noted, though, that lenses made from these materials and treated with organic solvents must be thoroughly rinsed and washed in order to remove any residues of the organic solvent from the lenses.

It is therefore an object of the present invention to provide a method by which excess lens forming material, which is non-polymerized and/or non-cross-linked, may reliably be removed from the exposed surface of a molded lens. A method shall be provided which enables a cleaning of the exposed lens surface without the use of organic solvents. A method and a device shall be provided, which may be easily integrated in known production lines for ophthalmic lenses, such as contact lenses.

These and still further objects are met by a method of separating excess lens forming material from a molded ophthalmic lens, more specifically a contact lens, which comprises the method steps listed in patent claim 1. The objects are also met by an apparatus for carrying out the method which comprises at least the features claimed in the independent apparatus claim. Further improvements of the invention and preferred embodiments are subject of the dependent claims.

SUMMARY

The invention provides a method of removing excess lens forming material from a molded ophthalmic lens, such as the peripheral region of a contact lens. In order to form a lens, a lens forming material is dosed into a mold cavity of a mold comprising female and male mold halves to and is polymerized and/or cross-linked by energy, such as UV energy, to form an ophthalmic lens. The mold is opened by moving the female and male mold halves apart from each other. The formed lens is supported on a carrier such, that a front surface of the lens is exposed. Residues of non-polymerized and/or non-cross-linked lens forming material (i.e., excess lens forming material) are removed mechanically by contacting the exposed surface of the formed lens for a period of time of about 0.5 seconds to about 4 seconds, preferably about 0.8 seconds to about 2 seconds, with a cleaner having a hardness which is smaller than (less than) that of the polymerized and/or cross-linked lens forming material.

By cleaning the formed ophthalmic lenses, such as contact lenses, mechanically, organic solvents, which are required for special lens forming materials, may be avoided. With other kinds of lens forming materials, the mechanical cleaning may be applied either as a main cleaning step or as cleaning step in addition to the flushing with deionised water (VE water). However, the mechanical cleaning is performed with a cleaner which is brought into contact with the exposed front surface of the formed lens. The cleaner has a hardness which is smaller than (less than) that of the polymerized and/or cross-linked lens forming material. This ensures that the exposed front surface of the lens is not abraded or otherwise damaged. The mechanical cleaning of the exposed front surface of the lens is performed within a time period of about 0.5 seconds to about 4 seconds, preferably about 0.8 seconds to about 2 seconds. This cleaning time fits into the cycle times of the manufacture process of the ophthalmic lenses and ensures a reliable removal of residues of non-polymerized and/or non-cross-linked lens forming material.

Mechanical cleaning of the exposed front surface of the formed lens in one embodiment of the invention may include, at least partly, an absorption of the non-polymerized and/or non-cross-linked material. For that purpose the cleaner is at least partly capable of absorbing the non-polymerized and/or non-cross-linked lens forming material.

The mechanical removal of non-polymerized and/or non-cross-linked lens forming material may be improved by moving the cleaner relative to the exposed lens surface, when they have been brought into contact with each other.

In an embodiment, the cleaner is rotated relative to the exposed front surface of the formed lens. Usually this may be easier to accomplish than a rotation of the lens together with its carrier.

Removal of the non-polymerized and/or non-cross-linked residues may be enhanced if the cleaner is rotated with a rotation speed of about 5 to about 250 revolutions per minute. In embodiments it may be preferred to rotate at a speed of about 10 to about 100 revolutions per minute, and for example at about 25 revolutions per minute.

In a still further embodiment the cleaner is pressed against the exposed surface of the formed lens with a force which amounts to about 0.1 N to about 20 N, desirably about 0.2 N to about 5 N. These moderate pressures of the cleaner against the exposed front surface do not impair the latter, but improve the cleaning effect.

The parameters of the cleaner and its operations are selected such that the surface is treated with care. In order to avoid impairment of the optical region of the exposed front surface of the lens, only an annular peripheral portion which extends from an edge to about ½ to about ⅔ (one half to two thirds) of a radius of the formed lens is contacted with the cleaner. Thus, even if the surface was affected by the mechanical cleaning, this would only occur in a peripheral region of the lens and would not disturb the vision of the user of the lens.

Good cleaning results may be achieved if a porous material is selected as the cleaner. In an embodiment the porous material is selected to be a foamed material, such as, e.g., foamed polyether, having a geometric bulk density of less than 150 kg/m3, and in some embodiments about 50 kg/m3. In another embodiment the porous material is selected to be a sponge rubber having a geometric bulk density of less than 350 kg/m3, and in some embodiments about 160 kg/m3.

For periodic cleaning or for replacement in another embodiment the cleaner may be removed.

The mechanical cleaning of the formed lens may be performed immediately after the mold has been opened, with the formed lens still supported on the male mold half. The mechanical cleaning may be performed in addition to the flushing of the lens with a flushing medium or in replacement thereof. In an alternative embodiment the formed lens is mechanically cleaned only immediately prior to an optical inspection of the lens in an inspection station. The mechanical cleaning at this later stage in the production line may have the advantage, that the few further treatment steps following the optical inspection present practically nor more threat of soiling the exposed front surface of the lens.

A device for carrying out the method of removing excess lens forming material comprises a cleaner having a hardness which is smaller than (less than) that of a polymerized and/or cross-linked lens forming material, mounted to a stationary support, which is arranged in a production line for ophthalmic lenses, such as contact lenses, and which is capable of being moved in contact with an exposed front surface of a formed lens which is supported on a carrier. The device is simple in construction and operation and may easily be included into a production line for the manufacture of ophthalmic lenses, such as contact lenses.

In an embodiment which ensures good cleaning results, the cleaner is a foamed material, such as, e.g., foamed polyether, having a geometric bulk density of less than 150 kg/m3, and in some embodiments about 50 kg/m3. In another embodiment the porous material is selected to be a sponge rubber having a geometric bulk density of less than 350 kg/m3, and in some embodiments about 160 kg/m3.

BRIEF DESCRIPTION OF THE DRAWING

These and still further features and advantages will become apparent from the following description of an exemplary embodiment of the invention, reference being made to the only schematic drawing FIGURE, which is not to scale, and which shows a representation of a device for the removal of excess lens forming material from a molded ophthalmic lens, such as the peripheral region of a contact lens.

DETAILED DESCRIPTION

The following description of an exemplary embodiment of the invention is for illustrative purposes only and is not intended to limit of the scope of the invention.

The invention is exemplified with reference to the manufacture of ophthalmic lenses, such as contact lenses, in a so-called full mold process. In this known automated production process, a large number of contact lenses is manufactured with reusable molds in a closed loop process. A number of reusable molds, which each comprise associated female and male mold halves, are usually arranged in side-by-side configuration in worktrays which are transported consecutively through the individual treatment stations of a production line. The treatment stations comprise a dosing station, in which a lens forming material, usually a prepolymer or polymer solution, is metered or dosed into the mold and a polymerization station, in which the lens forming material is polymerized and/or cross-linked by the application of energy, such as UV energy, to form lens. Suitable polymers formed by photochemical polymerization of suitable prepolymers include polymers based on polyvinyl alcohols (PVA) or silicone hydrogels (SiHy) as well as based on polyethylene glycols (PEG).

During the UV light induced polymerization and/or cross-linking of the lens forming material within the molds the UV light in the respective zones which are outside of the areas required for contact lens production is masked. Thus, due to this spatial limitation of the irradiated UV light only the unmasked portion of the lens forming material in the mold cavity is hardened, whereas excess material e.g. in an overflow of the mold remains attached to the lens as "flash". In order to obtain fault-free lenses these residues of non-polymerized and/or non-cross-linked lens forming material must be separated from the molded lens. The contact lenses are removed from the molds and transported through an extraction, rinsing and washing station, a hydration station, a lens inspection station, a packaging station, and a sorting and storage station.

The present invention relates to the removal of residues of non-polymerized and/or non-cross-linked lens forming material from the formed ophthalmic lens, such as from an annular peripheral region of a molded contact lens.

The FIGURE shows an axially sectioned view of a contact lens 1 which is supported on a carrier 3 such, that its front surface 2 is exposed. The carrier 3 may be, e.g., a male mold half. This is the case, if the mechanical cleaning of the exposed front surface 2 of the molded lens 1 is performed after the opening of the mold, with the molded lens 1 still supported on the male mold half. The mechanical cleaning of the molded lens 1 may be performed in addition to the flushing of the lens with a flushing medium, such as, e.g. VE water or a suitable solvent, or as a replacement thereof. The mechanical cleaning of the lens, however may also only be performed, e.g., immediately ahead of an inspection station, in which the contact lenses are optically inspected for defects and residues of non-polymerized and/or non-cross-linked lens forming material. For that purpose the lens 1 is placed onto a carrier 3 such, that its front surface 2 is exposed, very similar to the position of the lens 1 immediately after the molding and the opening of the mold.

A device for mechanically cleaning the exposed front surface 2 of the molded lens 1 is generally designated with reference numeral 5. The cleaning device 5 comprises a cleaner 7 which is mounted to the front end of a support 6. The support 6 has about the shape of an inverted pot, and is capable of being moved axially towards the carrier 2 which supports the lens 1 with the exposed front surface 2, and back again. This axial movement is indicated by the double arrow A. Curved arrow R indicates, that the support 6 for the cleaner 7 is also capable of being rotated about its axis.

The cleaner 7 is a porous material which has a hardness that is smaller than (less than) that of the polymerized and/or cross-linked lens forming material. Suitable porous materials 7 may be selected from the foamed materials having a geometric bulk density of less than 150 kg/m3, such as about 50 kg/m3, and a sponge rubber having a geometric bulk density of less than 350 kg/m3, such as about 160 kg/m3. The foamed material may be, e.g., a foamed polyether. The porous cleaner 7 has the capability of absorbing or containing the non-polymerized and/or non-cross-linked lens forming material. According to the depicted embodiment the porous material 6 has the shape of an annular ring. With this shape only a peripheral region of the lens 1 including the edge is mechanically treated with the cleaner 7, while a central optical region of the formed lens 1, is spared from the treatment. This construction takes into account that a soiling of the exposed lens surface 2 with non-polymerized and/or non-cross-linked lens forming material usually mainly occurs only in the peripheral region. The width of the annular shaped cleaner 7 is selected such, that an annular peripheral region of the lens 1 may be treated which extends from the edge of the lens 1 to about ½ to about ⅔ of a radius of the formed lens 1.

During the mechanical cleaning of the exposed lens surface 2 the cleaner 7 is rotated about its axis to accomplish a relative movement between the lens surface 2 and the cleaner 7. The rotation speed may be from about 5 to about 250 revolutions per minute, and desirably about 10 to about 100 revolutions per minute. In some embodiments, a rotation speed of about 25 revolutions per minute may be used. In addition, the cleaner 7 may be pressed against the exposed surface 2 of the lens 1 with moderate force, which may amount to about 0.1 N to about 20 N of force. In some embodiments, a force of about 0.2 N to about 5 N may be used. The contact pressure may be adjusted by the axial movement of the support 6 for the cleaner 7. Alternatively the contact pressure may be adjusted by placing one or more spacer rings in between the support 6 and the cleaner 7. For distance adjustment purposes, for periodical cleaning purposes and/or for replacement, the cleaner 7 may be mounted removable on the support 6. The mechanical cleaning of the exposed front surface 2 of the molded lens 1 may be performed during a time period of about 0.5 seconds to about 4 seconds, and desirably about 0.8 seconds to about 2 seconds.

The invention claimed is:

1. A method of removing excess lens forming material from a molded ophthalmic lens, comprising the steps of dosing a lens forming material into a mold cavity of a mold comprising female and male mold halves, applying energy to polymerize and/or crosslink the lens forming material and form the lens, opening the mold by moving said female and male mold halves apart from each other, supporting the formed lens on a carrier such, that a front surface of said lens is exposed, and then mechanically removing excess lens forming material consisting essentially of residues of non-polymerized and/or non-cross-linked lens forming material by contacting said exposed front surface of said formed lens for about 0.5 seconds to about 4 seconds with a cleaner having a hardness which is smaller than that of the polymerized and/or cross-linked lens forming material, and wherein said cleaner is rotated relative to said exposed front surface of the lens, and wherein said formed lens is mechanically cleaned with said formed lens being supported on said male mold half.

2. The method of claim 1, wherein said excess lens forming material is removed by contacting said exposed lens surface with a cleaner which is at least partly capable of absorbing said non-polymerized and/or non-cross-linked lens forming material.

3. The method of claim 1, wherein said excess lens forming material is removed by contacting said exposed lens surface with the cleaner for about 0.8 seconds to about 2 seconds.

4. The method of claim 1, wherein said cleaner and said exposed lens surface are brought into contact with each other and while in contact with each other are moved relative to one another.

5. The method of claim 1, wherein said cleaner is rotated with a rotation speed of about 5 to about 250 revolutions per minute.

6. The method of claim 5, wherein said cleaner is rotated with a rotation speed of about 10 to about 100 revolutions per minute.

7. The method of claim 5, wherein said cleaner is pressed against said exposed surface of said formed lens with a force of about 0.1 N to about 20 N.

8. The method of claim 7, wherein said cleaner is pressed against said exposed surface of said formed lens with a force of about 0.2 N to about 5 N.

9. The method of claim 1, wherein an annular peripheral portion which extends from an edge to about one half to two thirds of a radius of said formed lens is contacted with said cleaner.

10. The method of claim 1, wherein a porous material is used as said cleaner.

11. The method of claim 10, wherein said porous material is a foamed material having a geometric bulk density of less than 150 kg/m3.

12. The method of claim 11, wherein said porous material is a foamed polyether.

13. The method of claim 10, wherein said porous material is a sponge rubber having a geometric bulk density of less than 350 kg/m3.

14. The method of claim 1, wherein said cleaner may be removed for a periodical cleaning thereof or for replacement.

15. The method of claim 1, wherein said formed lens is mechanically cleaned immediately prior to an optical inspection of said lens in an inspection station with said lens being supported on a carrier.

* * * * *